L. W. ANDERSEN.
METHOD OF MANUFACTURING SCREWS.
APPLICATION FILED JULY 18, 1913.

1,145,737.

Patented July 6, 1915.

Inventor
L. W. Andersen

Witnesses
By Chas. E. Brock
Attorney

UNITED STATES PATENT OFFICE.

LAURITZ W. ANDERSEN, OF WATERBURY, CONNECTICUT, ASSIGNOR TO THE PLUME & ATWOOD MANUFACTURING COMPANY, OF WATERBURY, CONNECTICUT, A CORPORATION OF CONNECTICUT.

METHOD OF MANUFACTURING SCREWS.

1,145,737. Specification of Letters Patent. Patented July 6, 1915.

Application filed July 18, 1913. Serial No. 779,731.

*To all whom it may concern:*

Be it known that I, LAURITZ W. ANDERSEN, a citizen of the United States, residing at Waterbury, in the county of New Haven and State of Connecticut, have invented a new and useful Improvement in Methods of Manufacturing Screws, of which the following is a specification.

This invention relates generally to screws and more particularly to that class of screws employed in the assemblage of metal fixtures either electric light, gas or vapor, and more especially the invention relates to the method or manner of manufacturing said screws.

The object of my invention is to provide an exceedingly simple and easily practised method which will effect a very considerable saving of material and also time and labor in the manufacture of this class of screws. Heretofore these screws have been made from a piece of rod metal of uniform diameter throughout, said diameter corresponding with the head of the screw to be formed and this screw has usually been made by cutting and in such operation a considerable portion of the rod was cut away, thereby consuming considerable time in the cutting operation and at the same time wasting all that portion of the rod which was cut away in forming the thread and head. With my invention I avoid these objections by employing a piece of wire the diameter of which is the diameter of the finished screw, the head of said screw being formed by heading up the end of wire in suitable dies, the thread being rolled upon the wire after the heading operation has been completed.

My invention also embodies the employment of a washer at the juncture of the head and screw portions, and my invention embodies certain other features hereinafter more fully described and pointed out in the claims.

Figure 1:
Figure 2:
Figure 3:
Figure 4:
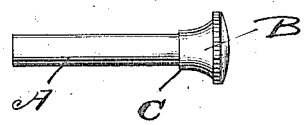
Figure 5:
Figure 6:
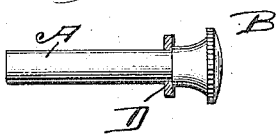
Figure 7:
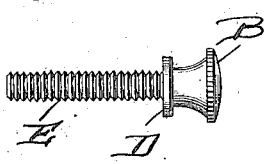

In the drawings forming a part of this specification: Figure 1 is a detail perspective view of a section of rod heretofore employed for the production of an ordinary cut screw. Fig. 2 is a detail view of the screw cut from the stock illustrated in Fig. 1. Fig. 3 is a detail perspective view of a piece of wire stock from which my improved construction of screw is manufactured. Fig. 4 is a view of said wire stock after the first operation thereon, said operation consisting in punching or heading up the head of screw. Fig. 5 is a detail view of a washer employed in connection with the structure illustrated in Fig. 4. Fig. 6 is an elevation partly in section showing the washer swaged or otherwise fixed upon the headed stock. Fig. 7 is a detail view of the finished screw.

In carrying out my invention I employ a piece of wire stock A, one end of which is headed up in suitable dies to provide the head B and shoulder C. Upon this headed wire I place the washer D, said washer being securely fixed by swaging or any other process in order to securely fasten the said washer thereon providing a suitable collar or shoulder at the proper point. The material thus treated is then subjected to thread rolling process and the thread E rolled upon the wire completing the screw which is exactly the same as the screw manufactured by the screw cutting process heretofore described, being equally as strong and efficient.

By means of my method a very great saving in metal is accomplished and the method of manufacture is also economical as to time and cost of production.

Furthermore by means of my process I am able to quickly and easily manufacture screws with varying types of heads and collars which could not be accomplished by the cutting process except at a very great cost.

It will thus be seen that I provide a novel construction of screw made by a novel method and which accomplishes all of the objects and overcomes the objections hereinbefore referred to.

What I claim is:—

1. The herein described method of making screws which consists in enlarging one end of wire stock and providing a head, swaging a washer or collar upon said stock and against said head, and finally rolling the threads upon said stock.

2. As a new article of manufacture, a wire screw comprising a threaded shank, a round head having a shoulder at the juncture of said head and shank, said head and shank being integral, and a collar rigidly fixed upon the shank and against the shoulder, as set forth.

LAURITZ W. ANDERSEN.

Witnesses:
C. W. NORTHROP,
A. J. STORZ.